April 2, 1968  P. O. BOBO  3,376,374
POLYPHASE ARC FURNACE WITH CONTROL SYSTEM TO RAISE ONE
ELECTRODE PRIOR TO ALL ELECTRODES STRIKING AN ARC
Filed Oct. 30, 1964

INVENTOR
Powell O. Bobo
BY Donald R. Lackey
ATTORNEY

United States Patent Office

3,376,374
Patented Apr. 2, 1968

3,376,374
POLYPHASE ARC FURNACE WITH CONTROL
SYSTEM TO RAISE ONE ELECTRODE PRIOR
TO ALL ELECTRODES STRIKING AN ARC
Powell O. Bobo, Wilkinsburg, Pa., assignor to Westinghouse Electric Corporation, East Pittsburgh, Pa., a corporation of Pennsylvania
Filed Oct. 30, 1964, Ser. No. 407,813
7 Claims. (Cl. 13—13)

ABSTRACT OF THE DISCLOSURE

A control and protective system for the electrodes of a polyphase electric arc furnace. The loss of voltage between the first electrode to contact the melt upon start-up of the furnace, is used as a signal to activate means which prevents further downward movement of this electrode. Electrode breakage is thus prevented during the start-up period of an electric arc furnace, when conventional control is ineffective due to the absence of arc current.

Figure 2:
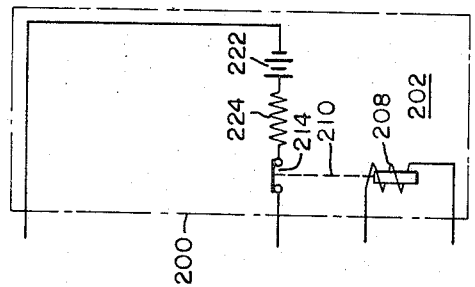

The location of the electrode relative to the melt in an electric arc furnace is generally governed by a control system responsive to the impedance of the arc between the electrode and the melt. The impedance of the arc is measured by balancing the voltage drop across the arc (electrode to melt) with the current through the arc. When a signal responsive to arc voltage is equal to a signal responsive to arc current, there will be no "error signal," and the electrode will be allowed to remain in its position until an unbalance occurs. If the signal responsive to arc voltage exceeds the signal responsive to arc current, the difference in the magnitudes of the signals is used as an error signal which causes the electrode to lower until the signals balance. If the signal responsive to arc current exceeds the signal responsive to arc voltage, the difference in the magnitude of the signals is used as an error signal to cause the electrode to raise until the signal is balanced.

In a three-phase electric arc furnace each phase is connected to its own electrode, and each electrode responds to its own impedance through individual control systems. In starting a melt, the electrodes are placed under automatic control. Full voltage will be applied to the electrodes, and, since no arcs will be drawn at this stage, there will be no arc current. Since the signal responsive to the voltage from the electrode to the melt is unopposed, the error signal will be maximum in the direction to move the electrode toward the melt. When the first electrode contacts the melt, the signal responsive to the voltage from the electrode to the melt will drop to zero. Since at least two electrodes must contact the melt before a circuit is completed, there will be no current flow between the first electrode to contact the melt and the melt, and the signal responsive to arc current will be zero. Thus, there will be no reversing or stopping signal at the instant the first electrode contacts the melt, and the momentum of the electrode and its driving means will cause the electrode to continue its downward movement, even though the difference between the voltage and current responsive signals is zero. This additional downward movement of the electrode is undesirable, as the electrode may be broken by contacting fresh charges of scrap metal.

Accordingly, it is an object of this invention to provide a new and improved control system for electric arc furnaces.

Another object of this invention is to provide a new and improved control system for polyphase electric arc furnaces that will prevent further downward movement of the first electrode to contact the melt.

Briefly, the present invention accomplishes the above cited objects by utilizing a loss of voltage between the electrode and the melt when the electrode contacts the melt, as an instantaneous signal to apply reversing or stopping control to the electrode and prevent it from continuing its downward movement. The signal provided by the loss of voltage between the electrode and melt activates means which provides a "raise" signal, and the raise signal is applied to the electrode drive means.

Further objects and advantages of the invention will become apparent as the following description proceeds, and features of novelty which characterize the invention will be pointed out in particularity in the claims annexed to and forming a part of the specification.

Figure 1:
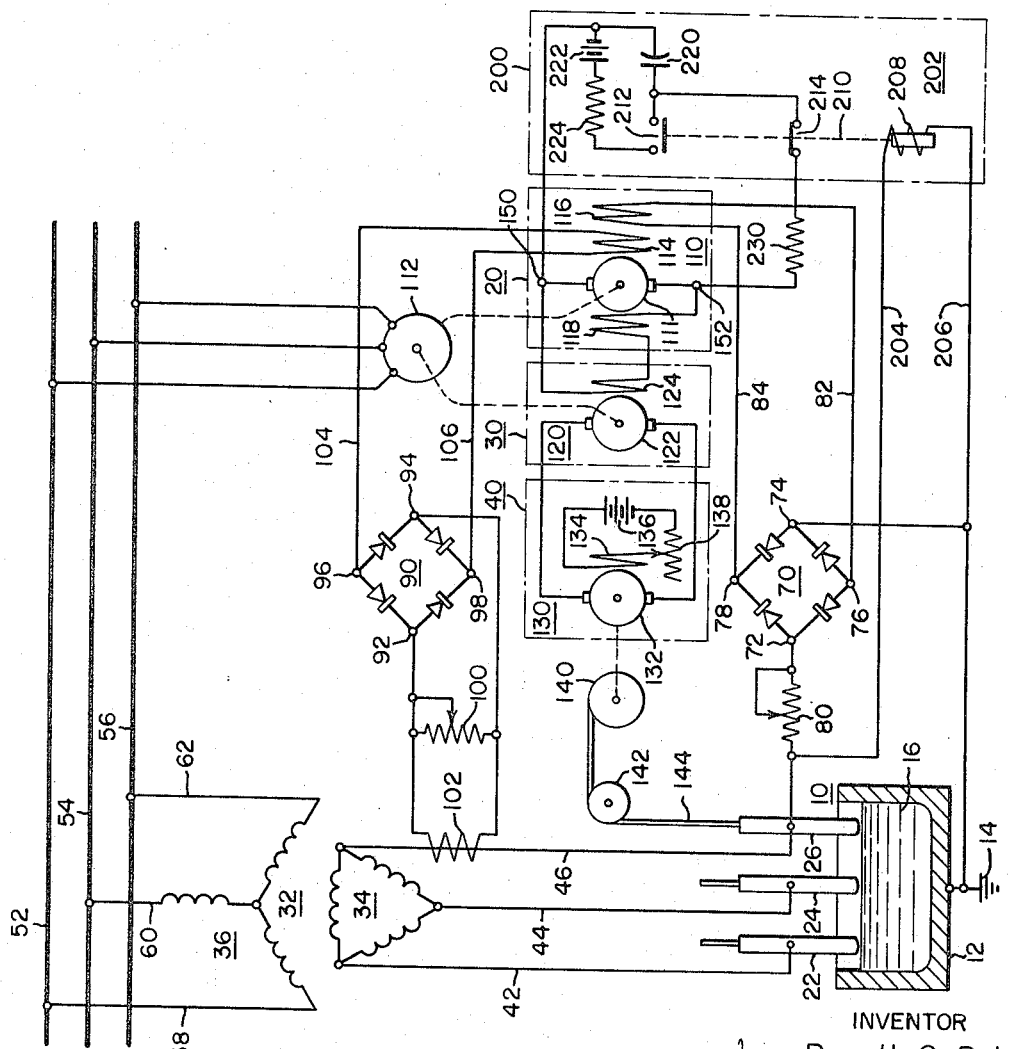

For a better understanding of the invention, reference may be had to the accompanying drawings in which:

FIGURE 1 is a schematic diagram illustrating an embodiment of the invention; and FIG. 2 is a schematic diagram illustrating another embodiment of the invention.

Referring now to the drawings, and FIG. 1 in particular, there is shown a three-phase electric arc furnace 10, regulating means 20 responsive to the arc voltage and arc current of one of the electrodes of electric arc furnace 10, amplifying means 30 for amplifying the signal produced by regulating means 20, and electrode drive means 40, which acts in response to the amplified signal from regulating means 20 to position the electrode to be controlled.

More specifically, electric arc furnace 10 includes a container 12, grounded at 14, and containing a molten charge or melt 16. A plurality of electrodes 22, 24 and 26 are suspended over the melt 16, with the lower ends of electrodes 22, 24 and 26 disposed in close proximity with the melt 16. Electrodes 22, 24 and 26 are connected to the secondary winding 34 of a three-phase transformer 32 through line conductors 42, 44 and 46, respectively, and the primary winding 36 of transformer 32 is connected to a three-phase power system, represented by conductors 52, 54, and 56, through line conductors 5, 60 and 62, respectively.

Since the individual electrode control systems for governing the position of each of the electrodes 22, 24 and 26 are the same, only the control system for electrode 26 is shown in FIG. 1. The electrodes 22 and 24 will each have a similar system which will operate the same as the control system for electrode 26, which will be hereinafter described.

Basically, the control system comprises a regulator 20, which is responsive to the arc voltage and arc current of the electrode 26. A unidirectional signal responsive to the arc voltage may be derived by connecting the input terminals 72 and 74 of a single phase, full wave, bridge rectifier 70 from the electrode 26 to the grounded container 12, with terminal 72 being connected to movable electrode 26 through adjustable resistor 80, and terminal 74 being connected to the container 12. The unidirectional signal appearing at output terminals 76 and 78 of rectifier 70 is responsive to or is a measure of the arc voltage, and is applied to regulating means 20 through conductors 82 and 84.

A unidirectional signal responsive to arc current may be derived by connecting the input terminals 92 and 94 of a single-phase, full wave, bridge rectifier 90 to a current transformer 102, which is disposed in inductive relation with line conductor 46. Adjustable resistor 100 is connected across the current transformer 102. The unidirectional signal appearing across adjustable resistor 100 is responsive to or is a measure of the arc current of electrode 26, and is applied to regulating means 20 through conductors 104 and 106.

Regulating means 20 may be a rotating type regulator 110 driven by a suitable prime mover 112, as shown in FIG. 1, or any other type of regulator, such as regulators of the magnetic amplifier type, electronic tube type, or semiconductor type. In general, regulating means 20 compares the arc voltage responsive signal from rectifier 70 with the arc current responsive signal from rectifier 90, and produces a polarized error signal if one signal is larger than the other, with the polarity being determined by which of the two signals are larger. No signal will be produced if the two signals are balanced or equal to each other. Adjustable resistors 80 and 100 provide the necessary adjustments for obtaining a balance between the arc voltage and arc current derived signals when electrode 26 is disposed a proper distance from the melt 16 for the operating conditions.

The polarized error signal from regulating means 20 may be amplified in one or more stages of amplification, such as amplifying means 30, illustrated in FIG. 1 as being a rotating amplifier 120 having an armature 122 and field winding 124, and driven by prime mover 112. Amplifying means 20 may also be an amplifier of the magnetic amplifier type, electronic tube type, or semiconductor type, if desired.

The amplified error signal from amplifying means 30 and regulating means 20 is then applied to electrode drive means 40, which may be a reversible direct current motor 130, whose direction of rotation is determined by the polarity of the error signal applied to armature 132. Motor 130 also includes a field winding 134 energized from a suitable unidirectional source, represented by battery 136, through an adjustable resistor 138. The electrode drive means 40 determines the position of electrode 26 relative to the melt 16 by actuating suitable mechanical means, such as a winding drum 140, pulley 142, and cable 144, as shown in FIG. 1, or a rack and pinion, or other suitable means.

Rotating regulator 110 includes an armature 111 driven by prime mover 112, control winding 114 connected to be responsive to a measure of the arc current through line conductors 104 and 106, control winding 116 connected to be responsive to a measure of the arc voltage through conductors 82 and 84, and a self-exciting field winding 118. Control windings 114 and 116 are connected with their magnetic fields opposed to one another. Prime mover 112 may be a motor connected to the source of alternating current supply voltage, represented by conductors 52, 54 and 56, or it may be connected to any other suitable source of potential.

During normal operating conditions of the arc furnace 10, the electrode 26 will be maintained at a position relative to the melt 16 that produces arc voltage and arc current responsive signals that provide equal but opposite magnetic fields in control windings 116 and 114 of rotating regulator 110. The effects of the control windings 114 and 116 are thus cancelled, and no voltage will be applied to electrode drive means 43.

If the arc voltage responsive signal exceeds the arc current responsive signal, the resultant magnetic field produced by the control windings 114 and 116 will cause the armature 111 of rotating regulator 110 to develop a voltage, which will be assumed as making terminal 150 of armature 111 more positive than terminal 152. Current will flow through field winding 124 of rotating amplifier 120 and produce a voltage in armature 122 having a polarity that causes motor 130 to rotate in the direction required to lower the electrode 26. Electrode 26 is lowered until the signals responding to arc current and arc voltage again produce equal and opposite magnetic fields in control windings 114 and 116.

If the arc current responsive signal exceeds the arc voltage responsive signal, the resultant magnetic field produced by control windings 114 and 116 will cause the armature 111 and rotating regulator 110 to develop a voltage which will make terminal 152 more positive than terminal 150. Current will flow through field winding 124 of rotating amplifier 120 and produce a voltage in armature 122 having a polarity that will cause motor 130 to rotate in the direction required to raise electrode 26. Electrode 26 will be raised until the signals responsive to arc current and arc voltage again provide signals which create equal and opposite magnetic fields in control windings 114 and 116.

Signals responsive to arc voltage and arc current comprise an excellent means for regulating electrode position. During startup of the furnace, however, the danger of electrode breakage is present if the regulator is operated as hereinbefore described. Upon startup there is no current flowing through the electrodes, and there will be no current flowing until at least two electrodes contact the melt 16 simulatneously and establish a complete circuit. Thus, when the electric furnace is started and voltage applied to electrodes 22, 24 and 26, there will be an arc voltage signal applied to control winding 16, but no signal will be applied to control winding 114. The electrodes 22, 24 and 26 will all be driven downward toward the melt 16. Since the electrodes 22, 24 and 26 are all individually controlled, one of the electrodes will in all probability contact the melt 16 before the others. Assume that electrode 26 strikes the melt first. The voltage between the electrode 26 and the melt 16 will drop to zero, but since a complete circuit will not be established until another electrode simultaneously contacts the melt 16, no current will flow through electrode 26. There will, therefore, be no reversing or braking action upon electrode 26, and it will continue to move downward after contacting the melt 16 due to the momentum and inertia of the driving means 40 and electrode 26. The electrode 26 may be broken against fresh charges of scrap metal if allowed to continue to move downward after contacting the melt.

The danger of electrode breakage may be eliminated if the first electrode to contact the melt 16 is stopped at the instant contact with the melt is made. This may be accomplished by utilizing the teachings of this invention, whereby loss of voltage between the electrode 26 and the melt 16 is utilized as signal to apply a reversing or stopping signal to electrode 26. Protective means for detecting the loss of voltage and applying a reversing or stopping signal to electrode 26 is shown in FIG. 1 at 200. Protective means 200 includes voltage responsive means 202, which is connected to be responsive to the voltage between the electrode 26 and melt 16 through conductors 204 and 206. Voltage responsive means 202 may be a voltage responsive relay, having a solenoid coil 208 and mechanical linkage 210 which controls normally open contacts 212 and normally closed contacts 214. It will be obvious that other voltage responsive means may be utilized to provide the function of contacts 212 and 214, such as semiconductor switching means which are biased "on" or "off" through a combination of auxiliary biasing means and bias derived from the voltage between the electrode 26 and melt 16.

In this particular embodiment of the invention, the source of potential for stopping the electrode 26 is a charged capacitor 220. When voltage is applied to electrode 26 upon startup of the furnace 10, relay 202 will be energized, closing contacts 212 and opening contacts 214. When contacts 212 close, a source of unidirectional potential, represented by battery 222, is connected across capacitor 220, causing it to charge through resistor 224. When the electrode 26 contacts the melt 16, the voltage across relay 202 will drop to substantially zero, and relay 202 will be deenergized, opening contacts 212 and closing contacts 214. When contacts 214 close, capacitor 220 will discharge through resistor 230 and provide a signal to field winding 124 of rotating amplifier 120 which is of the same polarity as if rotating regulator 110 had produced a raise signal. The voltage magnitude of battery 222, or other suitable source of unidirectional potential, the size of capacitor 220, and the rate of discharge of the energy stored in the capacitor 220, determined by the size of resistor 230, are all selected to provide the desired signal duration and magnitude. By proper selection of these components, which determines the amount of charge and the RC constant, or rate of discharge, the electrode 26 may be made to stop as soon as it contacts the melt 16, or it may be made to reverse slightly.

Another embodiment of the invention is shown in FIG. 2. This embodiment involves applying a reversing signal of fixed value to the regulating means 20 and thus to the electrode driving means 40, which will cause the electrode to reverse until voltage between the electrode 26 and melt 16 is restored. This embodiment involves eliminating capacitor 220 from the circuit, eliminating contacts 212 and closing the portion of the circuit occupied by contacts 212, permanently. Thus, when voltage is applied to electrode 26, relay 202 will be energized, opening contact 214. When electrode 26 contacts the melt 26 and relay 202 is deenergized, contacts 214 will connect battery 222, or other source of unidirectional potential, into the regulating and amplifier circuits, 20 and 30, respectively, which will apply a reversing signal to electrode drive means 40 and electrode 26. The electrode 26 will reverse until voltage is restored between the electrode 26 and melt 16, and then reverse again, until a second electrode contacts the melt 16. The relatively slow movement of the electrodes makes it possible to use such an arrangement without excessive cycling of the first electrode, as the time it takes for the first electrode to stop and reverse will generally allow enough time for a second electrode to contact the melt 16, at which time normal regulating action will begin.

It should be noted that although the primary purpose of protective means 200 is to prevent electrode breakage upon startup of the furnace 10, that the protective circuit remains activated during normal operation of the furnace. Thus, a reversing or stopping signal will be applied to an electrode any time the voltage between the electrode and melt falls below the drop out value of voltage responsive means 202, regardless of the value of electrode current. This, however, is not a disadvantage, as when the voltage drops across the electric arc during operation of the furnace 10, such as during short circuit conditions, it is desirable that the electrodes be quickly raised. Protective means 200 will thus aid the regulating means 20 in quickly raising the electrode.

Although this invention has been described relative to electric arc furnaces utilizing arc impedance for control, it will be obvious that it will be equally applicable to any furnace control which utilizes voltage as a complete control signal or as part of the control signal, such as KW and/or KVAR signals, which require voltage as part of the signal.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. An electric arc furnace control system for controlling the position of a movable electrode with respect to the melt, comprising regulating means producing a signal whose magnitude and polarity are responsive to the electric condition of the eelctrode circuit, electrode drive means connected in circuit relation with said regulating means and moving the electrode away from the melt when the signal from the regulator is of one polarity and towards the melt when the signal is of opposite polarity, means responsive to the voltage between the electrode and melt, and a source of electrical energy, said voltage responsive means operating to connect said source of electrical energy in circuit relation with said electrode drive means to stop the electrode when the voltage between the electrode and melt drops to a predetermined magnitude.

2. An electric arc furnace control system for controlling the position of a movable electrode with respect to the melt, comprising regulating means responsive to a measure of the voltage between the electrode and the melt and a measure of the current flowing through the electrode, said regulating means producing a signal having a first polarity when the measure of the voltage between the electrode and melt exceeds the measure of the electrode current, and having a second polarity when the measure of the electrode current exceeds the measure of the voltage between the electrode and melt, electrode drive means responsive to the signal produced by said regulating means to lower the electrode when the signal has said first polarity, and to raise the electrode when the signal has said second polarity, means responsive to the voltage between the electrode and melt, and a source of electrical energy, said voltage responsive means operating to connect said source of electrical energy in circuit relation with said electrode drive means when the voltage between the electrode and melt drops to a predetermined magnitude, the polarity of said source of electrical energy relative to said drive means causing said drive means to raise the electrode until the voltage between said electrode and melt increases to a predetermined magnitude.

3. An electric arc furnace control system for controlling the position of a movable electrode with respect to the melt, comprising regulating means responsive to a measure of the voltage between the electrode and melt and a measure of the current in the electrode, said regulating means producing a signal having a first polarity when the measure of the voltage between the electrode and melt exceeds the measure of the electrode current, and having a second polarity when the measure of electrode current exceeds the measure of the voltage between the electrode and melt, electrode drive means responsive to the signal produced by said regulating means to lower the eelctrode when the signal has said first polarity, and raise the electrode when the signal has said second polarity, means responsive to the voltage between the electrode and melt, a source of electrical energy, capacitor means, said votlage responsive means connecting said source of electrical energy in circuit relation with said capacitor means to charge said capacitor means when the voltage between the electrode and melt exceeds a predetermined magnitude, said voltage responsive means connecting said capacitor means in circuit relation with said electrode drive means when the voltage between the electrode and melt drops to a predetermined magnitude, the charge on said capacitor means relative to said electrode drive means being of said second polarity and of sufficient magnitude to stop the electrode when said electrode is in the process of being lowered.

4. An electric arc furnace control system for controlling the position of a movable electrode with respect to the melt, comprising regulating means responsive to a measure of the voltage between the electrode and melt and a measure of the current in the electrode, said regulating means producing a signal having a first polarity when the measure of the voltage between the electrode and melt exceeds the measure of the electrode current, and having a second polarity when the measure of electrode current exceeds the measure of the voltage between the electrode and melt, electrode drive means, said electrod drive means being responsive to the signal produced by said regulating means to lower the eelctrode when the signal has said first polarity, and to raise the electrode when the signal has said second polarity, protective means for applying an error signal having said second polarity to said electrode drive means upon startup of the furnace when the electrode contacts the melt to prevent further lowering of the electrode and breakage of the electrode, said protetcive means including means responsive to the voltage between the electrode and melt and a source of unidirectional potential, said voltage responsive means connecting said source of unidirectional potential in circuit relation with said electrode drive means when the voltage between the electrode and melt drops to a predetermined magnitude, said source of unidirectional potential being of said second polarity relative to said electrode drive means and of sufficient magnitude to prevent downward movement of the electrode.

5. An electric arc furnace control system for controlling the position of a movable electrode with respect to the melt, comprising regulating means responsive to a measure of the voltage between the electrode and melt and a measure of the current in the electrode, said regulating means producing a signal having a first polarity when the measure of voltage between the electrode and melt exceeds a measure of the electrode current, and having a second polarity when the measure of electrode current exceeds the measure of the voltage between the electrode and melt, electrode drive means responsive to the signal produced by said regulating means to lower the electrode when the signal has said first polarity, and to raise the electrode when said signal has said second polarity, protective means for applying a signal of said second polarity to said electrode drive means upon startup of the furnace when the electrode contacts the melt, to prevent further lowering of the electrode, said protective means including means responsive to the voltage between the electrode and the melt, a source of unidirectional potential, and a capacitor, said voltage responsive means connecting said source of unidirectional potential in circuit relationship with said capacitor to charge said capacitor when a predetermined voltage exists between the electrode and melt, said voltage responsive means connecting said capacitor in circuit relation with said electrode drive means when the voltage between the electrode and melt drops to a predetermined magnitude, the magnitude and polarity of the charge on said capacitor preventing the electrode from any further downward movement.

6. A control system for one of the phases of a polyphase electric arc furnace for controlling the position of a movable electrode with respect to a molten bath independent of the electrodes of the other phases, comprising regulating means comparing a measure of the voltage between the electrode and melt and a measure of the electrode current, said regulating means producing a signal having a first polarity if the measure of the voltage between the electrode and the melt exceeds the measure of the electrode current, said regulating means producing a signal having a second polarity when the measure of electrode current exceeds the measure of voltage between the electrode and melt, electrode driving means responsive to the signal produced by said regulating means to lower the electrode when the signal has said first polarity, and raise the electrode when the signal has said second polarity, voltage responsive means, and a source of unidirectional potential, said voltage responsive means being responsive to the drop in voltage across the electrode and molten bath, when said electrode contacts the molten bath, to connect said source of unidirectional potential in circuit relation with said electrode drive means, the polarity of said source of potential with respect to said drive means preventing downward movement of the electrode.

7. A control system for one of the phases of a polyphase arc furnace for controlling the position of a movable electrode with respect to a molten bath independent of the electrodes of the other phases, comprising regulating means comparing a measure of the voltage between the electrode and melt and a measure of the electrode current, said regulating means producing a signal having a first polarity when the measure of the voltage between the electrode and melt exceeds the measure of the electrode current, said regulating means producing a signal having a second polarity when the measure of electrode current exceeds the measure of voltage between the electrode and melt, electrode drive means responsive to the signal produced by said regulating means to lower the electrode when the signal has said first polarity and raise the electrode when said signal has said second polarity, voltage responsive means, a source of unidirectional potential, a capacitor, and impedance means, said voltage responsive means connecting said source of unidirectional potential in circuit relation with said capacitor to charge said capacitor to a predetermined potential when voltage is applied to said electrode, said voltage responsive means connecting said capacitor in circuit relation with said impedance means and said electrode drive means when said electrode contacts the molten bath, the predetermined charge on said capacitor, the discharge rate of said capacitor determined by said impedance means, and the polarity of the capacitor charge relative to said electrode drive means cooperating to supply a signal to said electrode drive means which prevents downward movement of the electrode.

References Cited
UNITED STATES PATENTS 2,456,936  12/1948  Frostick _____ 13—13 XR BERNARD A. GILHEANY, *Primary Examiner.*

R. N. ENVALL, JR., *Assistant Examiner.*